United States Patent
Swaminathan et al.

(10) Patent No.: US 12,503,751 B2
(45) Date of Patent: Dec. 23, 2025

(54) HIGH ENTROPY ALLOY-BASED COMPOSITIONS AND BOND COATS FORMED THEREFROM

(71) Applicant: General Electric Company, Schenectady, NY (US)

(72) Inventors: Srinivasan Swaminathan, Bengaluru (IN); Shalini Thimmegowda, Bengaluru (IN)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 17/839,833

(22) Filed: Jun. 14, 2022

(65) Prior Publication Data
US 2023/0323516 A1  Oct. 12, 2023

(30) Foreign Application Priority Data
Apr. 11, 2022 (IN) .............................. 202211021535

(51) Int. Cl.
*C22C 21/16* (2006.01)
*C22C 9/00* (2006.01)
(Continued)

(52) U.S. Cl.
CPC ............... *C22C 21/16* (2013.01); *C22C 9/00* (2013.01); *C22C 16/00* (2013.01); *C22C 19/03* (2013.01);
(Continued)

(58) Field of Classification Search
None
See application file for complete search history.

(56) References Cited

U.S. PATENT DOCUMENTS

| | | | |
|---|---|---|---|
| 4,033,792 A | 7/1977 | Giamei et al. | |
| 5,154,884 A | 10/1992 | Wukusick et al. | |
| (Continued) | | | |

FOREIGN PATENT DOCUMENTS

| | | | |
|---|---|---|---|
| CN | 109750209 A | 5/2019 | |
| CN | 110295363 A | 10/2019 | |
| (Continued) | | | |

OTHER PUBLICATIONS

Lima et al. "Thermal and Environmental Barrier Coatings (TBCs/EBCs) for Turbine Engines." ASM Handbook, vol. 5A, Thermal Spray Technology. pp. 270-279. Year 2013. (Year: 2013).*
(Continued)

*Primary Examiner* — Brian D Walck
(74) *Attorney, Agent, or Firm* — Dority & Manning, P.A.

(57) ABSTRACT

A high entropy alloy-based composition is provided that has the formula: $(M^1_a M^2_b M^3_c M^4_d M^5_e M^6_f)CrAlY_{1-x-z}Zr_xMo_z$ where: each of $M^1$, $M^2$, $M^3$, $M^4$, $M^5$, and $M^6$ is a different alloying element selected from the group consisting of Ni, Co, Fe, Si, Mn, and Cu such that none of $M^1$, $M^2$, $M^3$, $M^4$, $M^5$, and $M^6$ are the same alloying element; $0.05 \leq a \leq 0.35$; $0.05 \leq b \leq 0.35$; $0.05 \leq c \leq 0.35$; $0.05 \leq d \leq 0.35$; $0.05 \leq e \leq 0.35$; $0 \leq f \leq 0.35$; $a+b+c+d+e+f=1$; $0 \leq x \leq 1$; $0 \leq z \leq 1$; and $0 \leq x+z \leq 1$.

18 Claims, 2 Drawing Sheets

(51) Int. Cl.
 C22C 16/00 (2006.01)
 C22C 19/03 (2006.01)
 C22C 19/07 (2006.01)
 C22C 27/04 (2006.01)
 C22C 27/06 (2006.01)
 C23C 30/00 (2006.01)

(52) U.S. Cl.
 CPC .............. *C22C 19/07* (2013.01); *C22C 27/04* (2013.01); *C22C 27/06* (2013.01); *C23C 30/005* (2013.01)

(56) References Cited

U.S. PATENT DOCUMENTS

| | | | |
|---|---|---|---|
| 5,482,578 A | 1/1996 | Rose et al. | |
| 6,982,123 B2 | 1/2006 | Budinger et al. | |
| 8,925,792 B1 | 1/2015 | Suzuki et al. | |
| 2002/0159914 A1* | 10/2002 | Yeh | C22C 1/02 420/580 |
| 2017/0218480 A1 | 8/2017 | Park et al. | |
| 2020/0255925 A1 | 8/2020 | Hu et al. | |
| 2020/0283874 A1 | 9/2020 | Hawk et al. | |

FOREIGN PATENT DOCUMENTS

| | | |
|---|---|---|
| CN | 111763904 A | 10/2020 |
| CN | 112853347 A | 5/2021 |
| CN | 113122841 A | 7/2021 |
| CN | 113881884 A | 1/2022 |

OTHER PUBLICATIONS

Gong et al. "Thermal barrier coatings with two layer bond coat on intermetallic compound Ni3Al based alloy." Intermetallics 13 ( 2005) pp. 295-299. Available online Sep. 13, 2004. (Year: 2004).*
Jadhav et al., An Investigation on High Entropy Alloy for Bond Coat Application in Thermal Barrier Coating System, Journal of Alloys and Compounds, vol. 783, Apr. 30, 2019, pp. 662-673. (Abstract Only) https://www.sciencedirect.com/science/article/abs/pii/S0925838818349326.
Ye et al., High-Entropy Alloy: Challenges and Prospects, Materials Today, vol. 19, No. 6, Jul./Aug. 2016, pp. 349-362.
Gurrappa, "Identification of hot corrosion resistant MCrAlY based bond coatings for gas turbine engine applications", Surface and Coatings Technology, Elsevier, NL, vol. 139, Jan. 1, 2001, pp. 272-283.
Lu et al., "Y/Hf-doped AlCoCrFeNi high-entropy alloy with ultra oxidation and spallation resistance", Corrosion Science, Oxford, GB, vol. 166, Jan. 1, 2020.

\* cited by examiner

HIGH ENTROPY ALLOY-BASED COMPOSITIONS AND BOND COATS FORMED THEREFROM

PRIORITY INFORMATION

This present application claims priority to Indian Provisional Patent Application Number 202211021535 filed on Apr. 11, 2022.

FIELD

This present disclosure generally relates to compositions suitable for use as in coating systems on components exposed to high-temperature environments, such as the hot gas flow path through a gas turbine engine. More particularly, the present disclosure is directed compositions for use in a thermal barrier coating ("TBC") system.

BACKGROUND

Gas turbine engines typically include an inlet, a fan, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight or to power a load, such as an electrical generator.

The use of TBCs on components such as combustors, high pressure turbine ("HPT") blades and vanes of gas turbine engines is increasing. Generally, the thermal insulation of a TBC enables such components to survive higher operating temperatures, increases component durability, and improves engine reliability. In order for a TBC to remain effective throughout the planned life cycle of the component it protects, a bond coat is typically present between the TBC and the substrate to help retain the TBC on the substrate during use.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
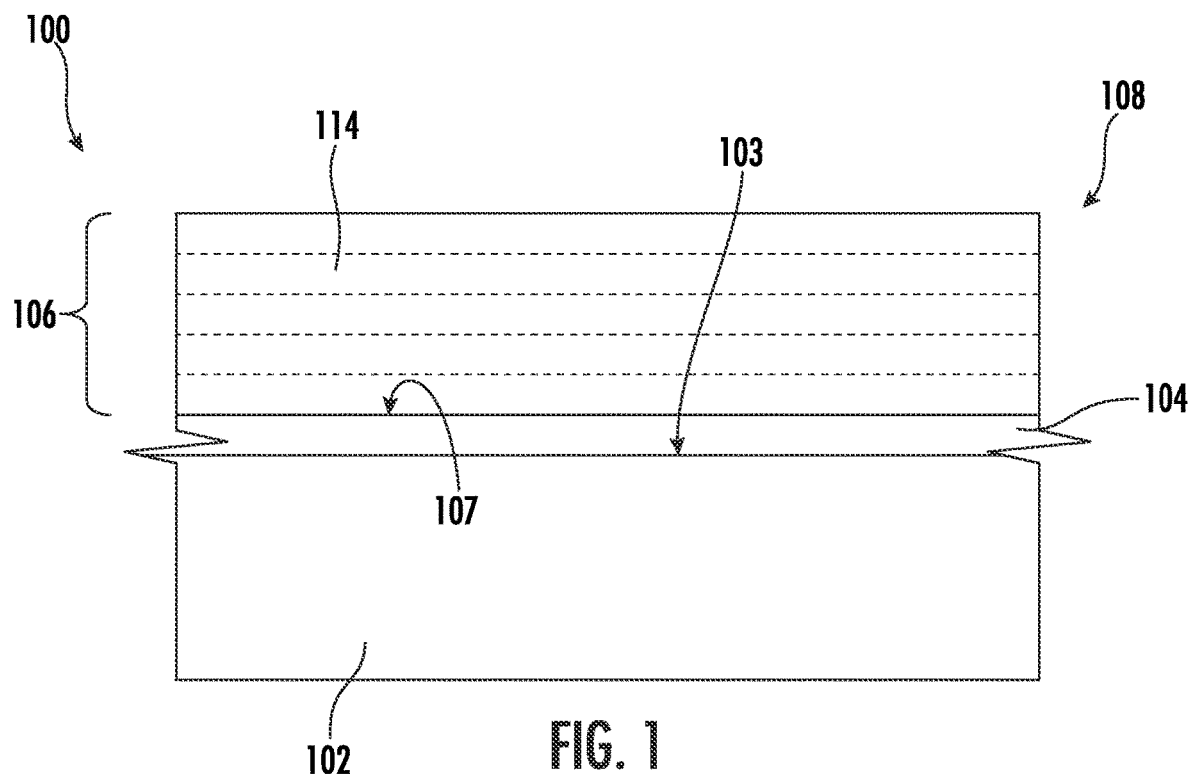
FIG. 1 is a schematic view of an exemplary coated component.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the word "exemplary" is means "serving as an example, instance, or illustration." Any implementation described herein as "exemplary" is not necessarily to be construed as preferred or advantageous over other implementations. Additionally, unless specifically identified otherwise, all embodiments described herein should be considered exemplary. In fact, it will be apparent to those skilled in the art that various modifications and variations can be made in the present disclosure without departing from the scope of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines. The term "turbomachine" or "turbomachinery" refers to a machine including one or more compressors, a heat generating section (e.g., a combustion section), and one or more turbines that together generate a torque output.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

As used herein, the term "high entropy alloy" ("HEA") refers to an alloy formed by mixing equal or relatively large proportions of five or more elements.

As used herein, a "rare earth element" refers to the rare earth elements of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), or mixtures thereof.

As used herein, the term "substantially free" is understood to mean completely free of said constituent, or inclusive of trace amounts of same. "Trace amounts" are those quantitative levels of chemical constituent that are barely detectable and provide no benefit to the functional or aesthetic properties of the subject composition. The term "substantially free" also encompasses completely free.

As used herein, the term "substantially equal" is understood to be inclusive of a minor trace variation of a quantitative level that is barely detectable and provides no benefit to the functional or aesthetic properties of the subject composition. For example, "substantially equal" may refer to being within a 1 percent margin (i.e., including values within 1 percent than the stated value). The term "substantially equal" also encompasses completely equal.

It is generally desired to improve the properties of the bond coat to extend the effective life of the TBC.

The present disclosure is generally related to a composition comprising an alloy that includes a high entropy alloy ("HEA") within an MCrAlY-based alloy to form a high entropy alloy-based composition that is particularly suitable for use in a bond coat with superior properties. For example, the alloy may have improved oxidation resistance to help slow the formation of a thermally grown oxide ("TGO") thereon.

Generally, the high entropy alloy-based composition includes at least five different alloying elements substituted for the "M" of the MCrAlY-based alloy, with the at least five different alloying elements being selected from the group of Ni, Co, Fe, Si, Mn, and Cu. Without wishing to be bound by any particular theory, it is believed that the selection of the at least five different alloying elements such that each alloying element has an atomic radius that is within 15% of the atomic radius of Ni allows for the desired crystal structure to be formed in the high entropy alloy-based composition. Additionally, the use of the HEA allows for control of the coefficient of thermal expansion ("CTE") of the material, as well as inhibiting TGO formation on the high entropy alloy-based composition.

In one embodiment, each of the at least five different alloying elements is present in an amount of 5 atomic % to 35 atomic %, with the sum of the atomic percent of the at least five different alloying elements equaling 1. For example, the high entropy alloy-based composition may have the formula according to Formula 1:

$$(M^1_a M^2_b M^3_c M^4_d M^5_e M^6_f) CrAlY_{1-x-z} Zr_x Mo_z \quad \text{Formula 1:}$$

where:
each of $M^1$, $M^2$, $M^3$, $M^4$, $M^5$, and $M^6$ is a different alloying element selected from the group consisting of Ni, Co, Fe, Si, Mn, and Cu such that none of $M^1$, $M^2$, $M^3$, $M^4$, $M^5$, and $M^6$ are the same alloying element;
$0.05 \leq a \leq 0.35$ (e.g., $0.1 \leq a \leq 0.25$);
$0.05 \leq b \leq 0.35$ (e.g., $0.1 \leq b \leq 0.25$);
$0.05 \leq c \leq 0.35$ (e.g., $0.1 \leq c \leq 0.25$);
$0.05 \leq d \leq 0.35$ (e.g., $0.1 \leq d \leq 0.25$);
$0.05 \leq e \leq 0.35$ (e.g., $0.1 \leq e \leq 0.25$);
$0 \leq f \leq 0.35$;
$a+b+c+d+e+f=1$;
$0 \leq x \leq 1$ (e.g., $0 \leq x \leq 0.5$, such as $0 \leq x \leq 0.25$);
$0 \leq z \leq 1$ (e.g., $0 \leq z \leq 0.5$, such as $0 \leq z \leq 0.25$); and
$0 \leq x+z \leq 1$ (e.g., $0 \leq x+z \leq 1$).

In one embodiment, f is no more than an insignificant trace amount (e.g., f is 0) such that only five alloying elements are present in the high entropy alloy-based composition. In one embodiment, the five alloying elements are present in atomic amounts that are different from each other. In an alternative embodiment, the five alloying elements are present in atomic amounts that are substantially equal to each other. For example, in this embodiment when five alloying elements are present, a is substantially equal to b; b is substantially equal to c; c is substantially equal to d; d is substantially equal to e; and f is no more than an insignificant trace amount (e.g., f is 0).

In one particular embodiment, the high entropy alloy-based composition may have the formula according to Formula 2:

$$(Cu_{0.2} Mn_{0.2} Fe_{0.2} Co_{0.2} Ni_{0.2}) CrAlY_{1-x-z} Zr_x Mo_z \quad \text{Formula 2:}$$

where:
$0 \leq x \leq 1$;
$0 \leq z \leq 1$; and
$0 \leq x+z \leq 1$.

In another particular embodiment, the high entropy alloy-based composition may have the formula according to Formula 3:

$$(Cu_{0.2} Si_{0.2} Fe_{0.2} Co_{0.2} Ni_{0.2}) CrAlY_{1-x-z} Zr_x Mo_z \quad \text{Formula 3:}$$

where:
$0 \leq x \leq 1$;
$0 \leq z \leq 1$; and
$0 \leq x+z \leq 1$.

In alternative embodiments, f is greater than 0 and less than or equal to 0.35 (i.e., $0 < f \leq 0.35$) such that each of Ni, Co, Fe, Si, Mn, and Cu are present in the high entropy alloy-based composition. In one embodiment, the six alloying elements are present in atomic amounts that are different from each other. In an alternative embodiment, the six alloying elements are present in atomic amounts that are substantially equal to each other. For example, in this embodiment when six alloying elements are present, a is substantially equal to b; b is substantially equal to c; c is substantially equal to d; d is substantially equal to e; and e is substantially equal to f.

In one particular embodiment, the high entropy alloy-based composition may have the formula according to Formula 4:

$$(Cu_{0.167} Si_{0.167} Mn_{0.167} Fe_{0.167} Co_{0.167} Ni_{0.167}) CrAlY_{1-x-z} Zr_x Mo_z \quad \text{Formula 4:}$$

where:
$0 \leq x \leq 1$;
$0 \leq z \leq 1$; and
$0 \leq x+z \leq 1$.

It is noted that Formula 4 refers to a sixth (i.e., ⅙) as being 0.167 as a rounded number, while still recognizing that the sum of these six atomic percentages is substantially equal to 1.

Referring to each of Formulas 1-4, Y can be replaced or combined with other elements having similar atomic radii, such as Zr and/or Mo. In one embodiment, the high entropy alloy-based composition may include Zr such that x is greater than 0 and less than or equal to 1 (e.g., $0 < x \leq 1$), such as $0 < x \leq 0.25$. In one embodiment, the high entropy alloy-based composition may include Mo such that z is greater than 0 and less than or equal to 1 (e.g., $0 < z \leq 1$), such as $0 < z \leq 0.25$. In one particular embodiment, the Y has a greater atomic concentration than the sum of the atomic concentrations of Zr and Mo, such as when $0 \leq x+z < 0.5$.

In alternative embodiments, x is no more than an insignificant trace amount such that the high entropy alloy-based composition is substantially free from Zr (e.g., x is 0). Similarly, in certain embodiments, z is no more than an insignificant trace amount such that the high entropy alloy-based composition is substantially free from Mo (e.g., z is 0). In one particular embodiment, both x and z are no more than an insignificant trace amount such that Y is substantially free from any substitution (e.g., x+z is 0).

As stated above, the high entropy alloy-based composition is particularly suitable for use in a bond coat between a surface of a component and a thermal barrier coating thereon.

Referring to FIG. 1, for example, an exemplary coated component 100 is shown formed from a substrate 102 having a surface 103 with a coating system 106 thereon. Generally, the coating system 106 includes a bond coat 104 on the surface 103 of the substrate 102, and a TBC 108 on an outermost surface 107 of the bond coat 104. In the embodiment shown, the bond coat 104 is directly on the surface 103 without any layer therebetween. The bond coat 104 may have a thickness of 10 μm to 100 μm on the surface 103 of the substrate 102.

In one embodiment, the bond coat 104 may include at least 80% by weight of the high entropy alloy-based composition (such as having the composition of any of Formulas 1-4). The balance of the bond coat 104 may be any material suitable for use in a bond coat or TBC, such as silicon, a silicide, a rare earth silicate, etc. In one embodiment, the bond coat 104 may include 90% by weight to 100% by weight of the high entropy alloy-based composition (such as having the composition of any of Formulas 1-4). In one particular embodiment, the bond coat 104 consists essentially of the high entropy alloy-based composition (such as having the composition of any of Formulas 1-4).

In an exemplary embodiment, the bond coat 104 is substantially a single-phase alloy. That is, the bond coat 104 is at least 80 percent by volume (vol. %), such as 80 vol. % to 100 vol. % (e.g., 95 vol. % to 100 vol. %), a single-phase.

Figure 2:
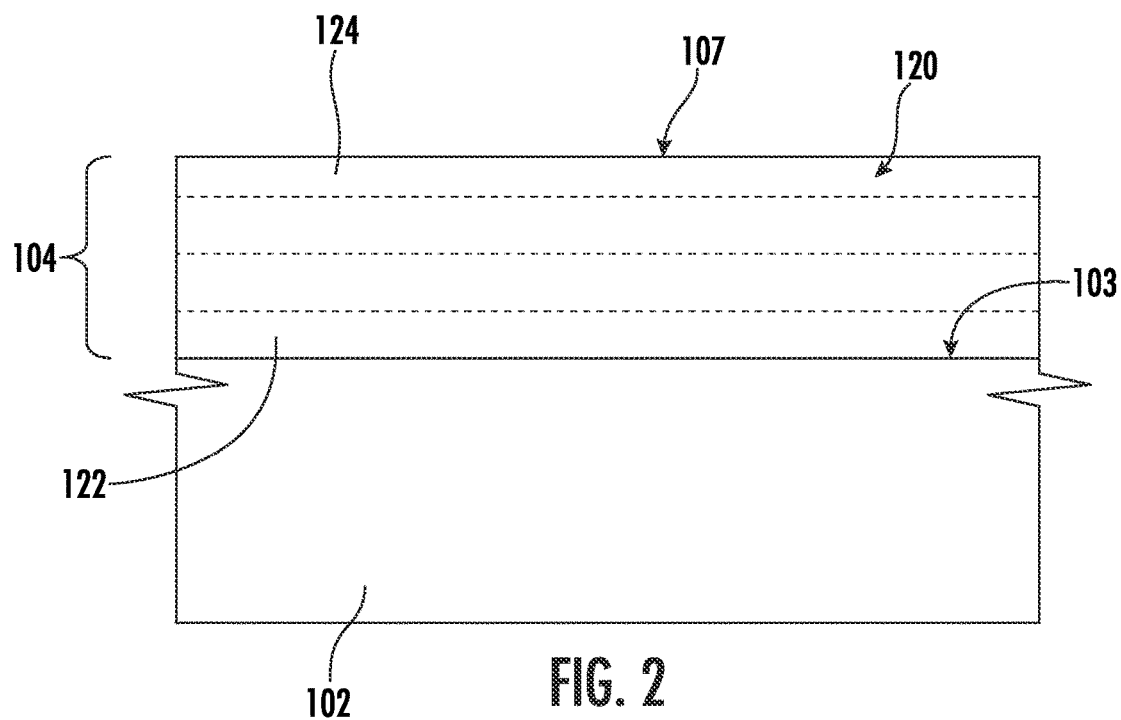
FIG. 2 is a schematic view of an exemplary bond coat on a surface of a component.

The bond coat 104 may have a compositional gradient that changes through the thickness of the bond coat 104 in certain embodiments. For example, referring to FIG. 2, an exemplary bond coat 104 having a compositional gradient is shown having a plurality of layers 120 spanning its thickness from the surface 103 of the substrate 102 to the outermost surface 107 of the bond coat 104. Such compositional gradients may be formed within the bond coat 104 by applying the individual layers 120 with different chemical compositions, and then curing/sintering the bond coat 104 together.

In one particular embodiment, the inner most layer 122 of the bond coat 104 that is adjacent to the surface 103 of the substrate 102 may have a different composition than an outermost layer 124 defining the outermost surface 107 of the bond coat 104. For instance, the inner most layer 122 may include a first high entropy alloy-based composition, and the outermost layer 124 may include a second high entropy alloy-based composition, with the first high entropy alloy-based composition and the second high entropy alloy-based composition are different in composition in at least one of their respective $M^1_a M^2_b M^3_c M^4_d M^5_e M^6_f$ (Formulas 1-4). For example, the first high entropy alloy-based composition may contain a particular alloying element while the second high entropy alloy-based composition is substantially free from that particular alloying element. Conversely, the first high entropy alloy-based composition may be substantially free from another particular alloying element while the second high entropy alloy-based composition contains that another particular alloying element. Additionally or alternatively, the concentration of the alloying elements may be different in the inner most layer 122 compared to the outermost layer 124 in at least one of $M^1_a M^2_b M^3_c M^4_d M^5_e M^6_f$ (i.e., at least two of a, b, c, d, e, and f is different in the inner most layer 122 compared to the outermost layer 124).

The substrate 102 may be any suitable material, for example a metal such as steel or superalloys (e.g., nickel-based superalloys, cobalt-based superalloys, or iron-based superalloys, such as Rene N5, N500, N4, N2, IN718, Hastelloy X, or Haynes 188) or other suitable materials for withstanding high temperatures. The coating system 106 may be disposed along one or more portions of the substrate 102 or disposed substantially over the whole exterior of the substrate 102. In particular embodiments, the coating system 106 may have a total thickness of 50 micrometer (e.g., micron or μm) to 2500 μm, such as 100 μm to 700 μm.

The TBC 108 may be formed from a plurality of individual layers 114. In particular embodiments, each of the layers 114 of the TBC 108 may have a layer thickness of 25 μm to 100 μm (e.g., 25 μm to 50 μm). One or more of the individual layers 114 may be formed from a stabilized ceramic that can sustain a fairly high temperature gradient such that the coated metallic components can be operated at gas temperatures higher than the metal's melting point. For instance, the stabilized ceramic material may be one or more of yttria stabilized zirconia (YSZ) and other rare-earth-stabilized zirconia compositions, mullite ($3Al_2O_3$-$2SiO_2$), alumina, ceria ($CeO_2$), lanthanum rare-earth zirconates, rare-earth oxides (e.g., $La_2O_3$, $Nb_2O_5$, $Pr_2O_3$, $CeO_2$), and metal-glass composites, and combinations thereof (e.g., alumina and YSZ or ceria and YSZ). Besides its high temperature stability, YSZ also has a good combination of high toughness and chemical inertness, and the thermal expansion coefficient of YSZ is a comparatively suitable match to that of the metallic components being coated. In one embodiment, the TBC 108 may include a layer based on an YSZ (e.g., 8YSZ) closest to the substrate 102, such as directly on the bond coat 104.

The individual layers 114 may be formed by any suitable process. For instance, one or more individual layer 114 may be formed by air-plasma spray (APS), suspension plasma spray (SPS), solution precursor plasma spray (SPPS), electron beam physical vapor deposition (EBPVD), high velocity oxygen fuel (HVOF), electrostatic spray assisted vapor deposition (ESAVD), and direct vapor deposition.

The coated component 100 is particularly suitable for use as a component found in high temperature environments, such as those present in gas turbine engines, for example, combustor components, turbine blades, shrouds, nozzles, heat shields, and vanes. In particular, the coated component 100 may be a component positioned within a hot gas flow path of the gas turbine such that the coating system 106 forms a thermal barrier for the underlying substrate 102 to protect the component 100 within the gas turbine when exposed to the hot gas flow path.

Figure 3:
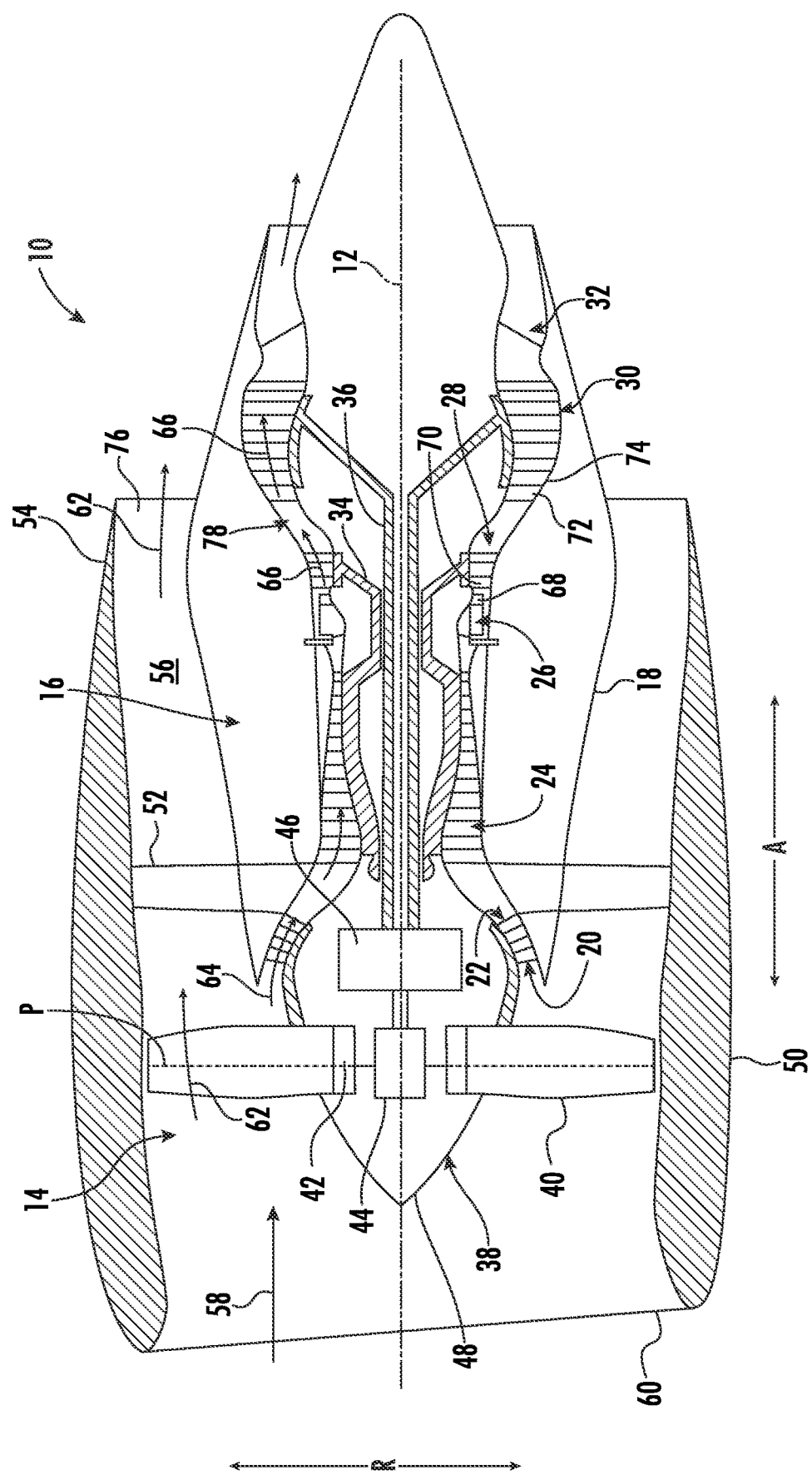
FIG. 3 is a schematic cross-sectional view of an exemplary gas turbine engine according to various embodiments of the present subject matter.

FIG. 3 is a schematic cross-sectional view of a gas turbine engine in accordance with an exemplary embodiment of the present disclosure. More particularly, for the embodiment of FIG. 3, the gas turbine engine is a high-bypass turbofan engine 10, referred to herein as "turbofan engine 10." As shown in FIG. 3, the turbofan engine 10 defines an axial direction A (extending parallel to a longitudinal axis 12 provided for reference) and a radial direction R. In general, the turbofan engine 10 includes a fan section 14 and a core turbine engine 16 disposed downstream from the fan section 14. Although described below with reference to a turbofan engine 10, the present disclosure is applicable to turbomachinery in general, including turbojet, turboprop, and turboshaft gas turbine engines, including industrial and marine gas turbine engines and auxiliary power units. It is also applicable to other high temperature applications that contain water vapor in the gas phase, such as those arising from combustion of hydrocarbon fuels.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP spool 36 across an optional power gear box 46. The power gear box 46 includes a plurality of gears for stepping down the rotational speed of the LP spool 36 to a more efficient rotational fan speed.

Referring still to the exemplary embodiment of FIG. 3, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan engine 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan engine 10, also providing propulsive thrust. The HP turbine 28, the LP turbine 30, and the jet exhaust nozzle section 32 at least partially define a hot gas path 78 for routing the combustion gases 66 through the core turbine engine 16. For example, the coated component 100 (FIGS. 1 and 2) may be particularly suitable as a component in contact with the combustion gases 66, including but not limited to, the HP turbine stator vanes 68, the HP turbine rotor blades 70, the LP turbine stator vanes 72, the LP turbine rotor blades 74, components within the combustion section 26 (e.g., a combustion liner), and the like.

Further aspects are provided by the subject matter of the following clauses:

1. A high entropy alloy-based composition having the formula:

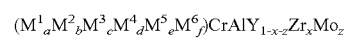
$(M^1_a M^2_b M^3_c M^4_d M^5_e M^6_f)CrAlY_{1-x-z}Zr_xMo_z$ where: each of $M^1$, $M^2$, $M^3$, $M^4$, $M^5$, and $M^6$ is a different alloying element selected from the group consisting of Ni, Co, Fe, Si, Mn, and Cu such that none of $M^1$, $M^2$, $M^3$, $M^4$, $M^5$, and $M^6$ are the same alloying element; $0.05 \le a \le 0.35$; $0.05 \le b \le 0.35$; $0.05 \le c \le 0.35$; $0.05 \le d \le 0.35$; $0.05 \le e \le 0.35$; $0 \le f \le 0.35$; $a+b+c+d+e+f=1$; $0 \le x \le 1$; $0 \le z \le 1$; and $0 \le x+z \le 1$.

2. The composition of any preceding clause, where: $0.1 \le a \le 0.25$; $0.1 \le b \le 0.25$; $0.1 \le c \le 0.25$; $0.1 \le d \le 0.25$; and $0.1 \le e \le 0.25$.

3. The composition of any preceding clause, wherein f is 0.

4. The composition of any preceding clause, wherein a is substantially equal to b; b is substantially equal to c; c is substantially equal to d; and d is substantially equal to e.

5. The composition of any preceding clause, wherein a is substantially equal to b; b is substantially equal to c; c is substantially equal to d; d is substantially equal to e; and e is substantially equal to f.

6. The composition of any preceding clause, wherein x is 0.

7. The composition of any preceding clause, wherein z is 0.

8. The composition of any preceding clause, wherein $0 \le x \le 0.5$ and $0 \le z \le 0.5$.

9. The composition of any preceding clause, wherein $0 < x \le 0.25$.

10. The composition of any preceding clause, wherein $0 < z \le 0.25$.

11. The composition of any preceding clause, wherein $0 \le x+z < 0.5$ such that Y has a greater atomic concentration than Zr and Mo.

12. The composition of any preceding clause, wherein the alloy has the formula:

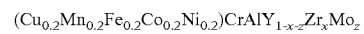
$(Cu_{0.2}Mn_{0.2}Fe_{0.2}Co_{0.2}Ni_{0.2})CrAlY_{1-x-z}Zr_xMo_z$ where: $0 \le x \le 1$; $0 \le z \le 1$; and $0 \le x+z \le 1$.

13. The composition of any preceding clause, wherein the alloy has the formula:

$(Cu_{0.2}Si_{0.2}Fe_{0.2}Co_{0.2}Ni_{0.2})CrAlY_{1-x-z}Zr_xMo_z$ where: $0 \le x \le 1$; $0 \le z \le 1$; and $0 \le x+z \le 1$.

14. A coated component, comprising: a substrate having a surface, wherein the substrate comprises a metal; a bond coat on the surface of the substrate, wherein the bond coat includes a layer comprising the composition of any preceding clause; and a thermal barrier coating on the bond coat.

15. A coated component, comprising: a substrate having a surface, wherein the substrate comprises a metal; a bond coat on the surface of the substrate, wherein the bond coat comprises a plurality of layers; and a thermal barrier coating on the bond coat, wherein each of the plurality of layers of the bond coat comprises 80% by weight or greater of a high entropy alloy-based composition having the formula:

$(M^1_aM^2_bM^3_cM^4_dM^5_eM^6_f)CrAlY_{1-x-z}Zr_xMo_z$ where: each of $M^1$, $M^2$, $M^3$, $M^4$, $M^5$, and $M^6$ is a different alloying element selected from the group consisting of Ni, Co, Fe, Si, Mn, and Cu such that none of $M^1$, $M^2$, $M^3$, $M^4$, $M^5$, and $M^6$ are the same alloying element; $0.05 \le a \le 0.35$; $0.05 \le b \le 0.35$; $0.05 \le c \le 0.35$; $0.05 \le d \le 0.35$; $0.05 \le e \le 0.35$; $0 \le f \le 0.35$; $a+b+c+d+e+f=1$; $0 \le x \le 1$; $0 \le z \le 1$; and $0 \le x+z \le 1$.

16. The coated component of any preceding clause, wherein the bond coat includes an innermost layer adjacent to the surface of the substrate and comprising a first high entropy alloy-based composition, and wherein the bond coat includes an outermost layer adjacent to the thermal barrier coating and comprising a second high entropy alloy-based composition, wherein the first high entropy alloy-based composition and the second high entropy alloy-based composition are different in composition in at least one of their respective $M^1_a M^2_b M^3_c M^4_d M^5_e M^6_f$.

17. The coated component of any preceding clause, wherein the bond coat has a compositional gradient from an innermost layer adjacent to the surface of the substrate to an outermost layer adjacent to the thermal barrier coating.

18. The coated component of any preceding clause, wherein the compositional gradient is in at least one of $M^1_a M^2_b M^3_c M^4_d M^5_e M^6_f$.

19. The coated component of any preceding clause, wherein the alloy is a single-phase alloy.

20. The coated component of any preceding clause, wherein the bond coat has a thickness of 10 μm to 100 μm.

21. An engine component, comprising: the coated component of any preceding clause.

22. The engine component of any preceding clause, wherein the engine component comprises at least one of a HP turbine stator vane, a HP turbine rotor blade, a LP turbine stator vane, a LP turbine rotor blade, or a combustion liner.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. An alloy-based composition having the formula:

$(M^1_aSi_{0.2}M^3_cM^4_dM^5_eM^6_f)CrAlY_{1-x-z}Zr_xMo_z$ where:
each of $M^1$, $M^3$, $M^4$, $M^5$, and $M^6$ is a different alloying element selected from the group consisting of Ni, Co, Fe, Mn, and Cu, such that none of $M^1$, $M^3$, $M^4$, $M^5$, and $M^6$ are the same alloying element;
$0.05 \le a \le 0.35$;
$0.05 \le c \le 0.35$;
$0.05 \le d \le 0.35$;
$0.05 \le e \le 0.35$;
$0 \le f \le 0.35$;
$a+c+d+e+f=0.8$;
$0 \le x \le 1$;
$0 \le z \le 1$; and
$0 \le x+z \le 1$.

2. The composition of claim 1, wherein f is 0, and wherein $M^1$, $M^3$, $M^4$, and $M^5$ are present in atomic amounts that are substantially equal to each other.

3. The composition of claim 1, where:
$0.1 \le a \le 0.25$;
$0.1 \le c \le 0.25$;
$0.1 \le d \le 0.25$; and
$0.1 \le e \le 0.25$.

4. The composition of claim 1, wherein f is 0.

5. The composition of claim 1, wherein x is 0.

6. The composition of claim 1, wherein z is 0.

7. The composition of claim 1, wherein $0 \le x \le 0.5$ and $0 \le z \le 0.5$.

8. The composition of claim 1, wherein $0 < x \le 0.25$.

9. The composition of claim 1, wherein $0 < z \le 0.25$.

10. The composition of claim 1, wherein $0 \le x+z < 0.5$ such that Y has a greater atomic concentration than Zr and Mo.

11. A coated component, comprising:
a substrate having a surface, wherein the substrate comprises a metal;
a bond coat on the surface of the substrate, wherein the bond coat includes a layer comprising the composition of claim 1; and
a thermal barrier coating on the bond coat.

12. A coated component, comprising:
a substrate having a surface, wherein the substrate comprises a metal;
a bond coat on the surface of the substrate, wherein the bond coat comprises a plurality of layers; and
a thermal barrier coating on the bond coat,
wherein each of the plurality of layers of the bond coat comprises 80% by weight or greater of the alloy based composition of claim 1.

13. The coated component of claim 12, wherein the bond coat includes an innermost layer adjacent to the surface of the substrate and comprising a first alloy-based composition, and wherein the bond coat includes an outermost layer adjacent to the thermal barrier coating and comprising a second alloy-based composition, wherein the first alloy-based composition and the second alloy-based composition are different in composition in at least one of their respective $M^1_a$, $M^3_c$, $M^4_d$, $M^5_e$, or $M^6_f$.

14. The coated component of claim 12, wherein the bond coat has a compositional gradient from an innermost layer adjacent to the surface of the substrate to an outermost layer adjacent to the thermal barrier coating.

15. The coated component of claim 14, wherein the compositional gradient is in at least one of $M^1_a$, $M^3_c$, $M^4_d$, $M^5_e$, or $M^6_f$.

16. The coated component of claim 12, wherein the alloy-based composition is a single-phase alloy.

17. The coated component of claim 12, wherein the bond coat has a thickness of 10 μm to 100 μm.

18. An alloy-based composition having the formula:

$(Cu_{0.2}Si_{0.2}Fe_{0.2}Co_{0.2}Ni_{0.2})CrAlY_{1-x-z}Zr_xMo_z$ where:
$0 \le x \le 1$;
$0 \le z \le 1$; and
$0 \le x+z \le 1$.

* * * * *